Patented May 27, 1952

2,598,646

UNITED STATES PATENT OFFICE 2,598,646

PRODUCTION OF POLYCHLOROETHENES

Aylmer Henry Maude and David Solomon Rosenberg, Niagara Falls, N. Y., assignors to Hooker Electrochemical Company, Niagara Falls, N. Y., a corporation of New York No Drawing. Application December 23, 1949, Serial No. 134,868

8 Claims. (Cl. 260—654)

This invention relates to a continuous process for making polychloroethenes, particularly perchloroethylene and trichloroethylene, by the reaction of pentachloroethane or tetrachloroethane with an aqueous alkaline earth metal hydroxide slurry.

This application is a continuation-in-part of our copending application S. N. 653,420 filed March 9, 1946, now abandoned.

In order that our invention may be more readily understood, we will describe our process as exemplified by the continuous production of trichloroethylene by reaction of tetrachloroethane with lime slurry in accordance with the following equation:

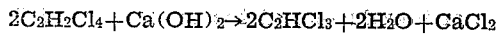

$$2C_2H_2Cl_4 + Ca(OH)_2 \rightarrow 2C_2HCl_3 + 2H_2O + CaCl_2$$

Prior to our invention trichloroethylene has been made commercially by reaction of tetrachloroethane with an aqueous suspension of lime in a batch process. In order to obtain as complete a reaction as possible in this process, it is necessary to maintain the calcium hydroxide in the form of a suspension, as by vigorous agitation. This reaction is accompanied by violent foaming. Any attempt to control this foaming by gradually introducing one reagent into the other has not been successful. Consequently, it has been necessary to use large reactors only partially filled with reactants, so as to provide adequate space for disintegration of the foam. This has resulted in a condition which greatly favors the corrosion of the reactors employed because of the severe corrosive action of chlorinated hydrocarbons on the usual ferrous metals of construction when associated with moisture. A disadvantage of using such large reactors has been a low yield of product per unit volume of reactor space. A further disadvantage of the batch process is that, during the distillation of the crude trichloroethylene from the reaction mixture, additional foaming is again encountered, thus necessitating still further expensive voluminous equipment.

It is, therefore, an object of this invention to provide a continuous process for the dehydrochlorination of polychloroethanes by reaction with an aqueous alkaline earth hydroxide slurry. A further object is to provide an economical process for the production of trichloroethylene or perchloroethylene which is readily adaptable to commercial scale manufacture. An additional object is to provide a process which gives a high yield of product per unit volume of reactor space employed. A principal object is to provide a process for the manufacture of trichloroethylene which controls the foaming characteristics of the reaction while allowing a high yield of product per unit volume of reactor space per unit of time. A further object is to provide a process which eliminates excessive corrosion of the reactors employed. Still other objects will become apparent hereinafter to those skilled in the art.

We have now found that in the dehydrochlorination of a hydrogen-containing polychloroethane by reaction with an aqueous alkaline earth metal hydroxide slurry, the aforesaid and related objects may be accomplished by continuously introducing the polychloroethane and aqueous alkaline earth metal hydroxide slurry into a closed chamber substantially completely filled with an agitated body of the liquid reaction mixture, while maintaining said mixture at a temperature below the boiling point of any of the organic azeotropes therein formed, continually transferring reaction mixture from said first chamber to a second chamber containing aqueous inorganic constituents of the reaction mixture maintained at a temperature above the boiling point of the organic azeotropes in the reaction mixture.

This invention includes two critical steps, (1) maintaining the reaction vessel substantially completely filled with an alkaline liquid reaction mixture, and (2) continually flash distilling organic constituents of the reaction mixture from an aqueous medium comprising the inorganic constituents thereof maintained at a temperature above the boiling point of any organic azeotropes therein.

In the production of trichloroethylene, tetrachloroethane and lime slurry containing between about 2½ and 25 per cent of calcium hydroxide in water, in between 5 and 50 per cent molar excess over that theoretically required, are continuously introduced into the bottom of a closed vessel. This vessel is maintained substantially completely filled with a vigorously agitated body of the liquid reaction mixture at a temperature below about 72 degrees centigrade, which temperature is below the boiling point of trichloroethylene in water (73 degrees centigrade). The reaction is exothermic, however, additional heat to maintain the reaction temperature above about 60 degrees centigrade and below about 72 degrees centigrade is obtained if necessary by introducing controlled quantities of live steam into the reaction zone. In order to obtain a high yield of trichloroethylene, we have found that it is only necessary to allow for a retention time in the reaction zone of about 20 to 40 minutes, preferably about 25 to 35 minutes.

Liquid reaction mixture is continually withdrawn from the top of the reaction vessel at a rate equal to the combined rate of introduction of the reactants, thus providing for maintaining the reaction vessel substantially completely filled with liquid reaction mixture. It is important that withdrawn reaction mixture be continually introduced into a flash distilling vessel partially filled with the residual aqueous medium comprising the inorganic constituents of the reaction mixture maintained at a temperature between about 94 and 103 degrees centigrade which temperature is above the boiling points of the azeotropes of tetrachloroethane or trichloroethylene in water but below the boiling point of the water-inorganic salt mixture. This manner of distilling off the product is advantageous because it prevents the accumulation of organic matter with the lime-containing calcium chloride solution and it assures the practically complete recovery of the organic constituents with the minimum of foaming. The distillation temperature is held at preferably a temperature of about 99 to 101 degrees centigrade, by introducing live steam into the distillation zone. The volatilized chlorinated organic constituents are continuously removed from the flash distillation chamber, then condensed and separated from any water to recover trichloroethylene.

Although this description has been specifically concerned with the preparation of trichloroethylene by the dehydrochlorination of symmetrical tetrachloroethane using a calcium hydroxide slurry, it is to be understood that other polychloro hydrocarbon ethanes having the formula $C_2H_xCl_y$ wherein $x$ is an integer from 1 to 4 inclusive, $y$ is an integer from 2 to 5, inclusive, and the sum of $x$ and $y$ is 6, may also be treated to produce a chloroethene having the formula $C_2H_{x-1}Cl_{y-1}$ wherein $x$ and $y$ have the above values. Representative ethanes include pentachloroethane, 1,1-dichloroethane, 1,2-dichloroethane, 1,1,2-trichloroethane, 1,1,1-trichloroethane, etc. Alkaline earth metal hydroxides other than calcium hydroxide, such as magnesium hydroxide, barium hydroxide, etc., may also be used. The temperature ranges given herein for trichloroethylene are critical. The corresponding temperature ranges for producing other chloroethenes are likewise critical; for example, the reaction temperature must be maintained below the boiling point of any of the organic azeotropes therein formed and the distillation temperature must be maintained at a temperature above the boiling points of the organic azeotropes in the reaction mixture but below the boiling point of the residual aqueous medium comprising the inorganic constituents of the reaction mixture.

The following examples illustrate one manner of conducting our invention.

Example I

A closed reactor provided with an agitator was completely filled with a lime slurry containing 5 per cent by weight of calcium hydroxide. Forty pounds of about 94 per cent tetrachloroethane per minute and 235 pounds of 5 per cent by weight calcium hydroxide slurry per minute, representing 20 per cent by weight excess $Ca(OH)_2$, were continuously introduced into the bottom section of the reaction vessel. The reactor was of such size as to provide for a contact time in the reaction zone of about 27 minutes. The reaction zone was maintained at a temperature of about 70 degrees centigrade by continuously introducing controlled amounts of live steam into the bottom section of the vessel through a sparger tube. Reaction mixture was continuously withdrawn from the reaction vessel at about the combined rate of introducing the reactants, which was 30 gallons per minute; and then continuously introduced into a separate distilling vessel containing aqueous calcium chloride and unreacted lime resulting from the reaction. This aqueous medium was maintained at a temperature of about 99 degrees centigrade by introducing live steam thereinto causing an azeotrope of trichloroethylene and small amounts of tetrachloroethane to be continuously flash distilled from the product introduced into the hot medium. This azeotrope was condensed and about 30 pounds per minute (or about 2.3 pounds per hour per gallon of reactor space) of trichloroethylene of about 95 per cent purity was continuously recovered by gravity separation from the condensed mixture.

Example II

In a manner similar to that of Example I, 47.6 parts by weight per minute of 94 per cent tetrachloroethane and about 300 parts by weight per minute of 5 per cent by weight of calcium hydroxide slurry per minute, representing 47 per cent excess $Ca(OH)_2$, were continuously introduced into a reaction zone maintained at a temperature of about 72 degrees centigrade. The retention time in the reaction zone was 38 minutes. The reaction mixture was continuously withdrawn from the reactor at the combined rate of introduction of the reactants, and then continuously flash distilled in a separate distilling vessel at a temperature of about 93 degrees centigrade. By condensing the organic materials, trichloroethylene of 97.5 per cent purity was recovered at the rate of 34.6 parts by weight per minute.

Example III

In the manner of the foregoing examples, about 2 parts by volume per minute of pentachloroethane and 15 parts by volume per minute of 5 per cent by weight calcium hydroxide slurry representing 20 per cent by weight excess $Ca(OH)_2$, were continuously introduced into the reaction zone which was maintained at a temperature of about 88 degrees centigrade. The retention time in the reaction zone was 58 minutes. The reaction mixture was continuously withdrawn from the reactor at the combined rate of introduction of the reactants, and then continuously flash distilled in a separate distilling vessel at a temperature of about 99 degrees centigrade. By condensing the organic materials, perchloroethylene was continuously recovered at the rate of 1.6 parts by volume per minute.

By operating in accordance with our invention, ordinary ferrous materials of construction may be used for the reaction vessel, because corrosion thereof due to condensed chlorohydrocarbons in the presence of moisture is substantially minimized, by maintaining the vessel substantially completely filled and all surfaces bathed with liquid alkaline reaction mixture, thus eliminating the possibility of attack by acid compounds on the reaction vessel. Our method also provides for eliminating foaming in the reaction vessel, by maintaining it substantially completely filled with liquid, thus allowing for a maximum yield per unit volume of reactor space. Also, by continuously flash distilling off both the product and unreacted polychloroethane we eliminate a condition which favors foaming; namely, the mixing of substantial quantities of organic compounds with lime and inorganic salts in the presence of water at the temperature of distillation and thereby provide for a further saving in the amount of equipment used for a given volume of production. In the process of our invention it is important that the flash distillation be effected at a temperature above the boiling point of any of the organic azeotropes in the reaction mixture to insure complete recovery of the product and any unreacted chloroethane.

Various modifications may be made in the method of the present invention without departing from the spirit or scope thereof, and it is to be understood that we limit ourselves only as defined in the appended claims.

We claim:

1. A continuous process for dehydrochlorinating a polychloroethane having the general formula $C_2H_xCl_y$ wherein $x$ is an integer from 1 to 4 inclusive, $y$ is an integer from 2 to 5 inclusive, and the sum of $x$ and $y$ is 6, which comprises: continuously introducing such polychloroethane in the liquid phase and an aqueous alkaline earth metal hydroxide slurry into a closed chamber substantially completely filled with an agitated body of liquid reaction mixture; maintaining said mixture at a reaction temperature below the boiling point of any of the organic azeotropes therein formed; continually transferring a portion of the total reaction mixture in the liquid phase, at a rate substantially equal to the combined rate at which the reactants are introduced into the first chamber, into a second chamber containing aqueous inorganic constituents of the reaction mixture maintained at a temperature above the boiling point of any of the organic azeotropes in the reaction mixture; and condensing the $C_2H_{x-1}Cl_{y-1}$ and any unreacted polychloroethane compound so flash-distilled.

2. The process of claim 1 wherein the alkaline earth metal hydroxide is calcium hydroxide.

3. The process of claim 1 wherein the polychloroethane dehydrochlorinated is pentachloroethane and perchloroethylene is produced.

4. The process of claim 1 wherein the polychloroethane dehydrochlorinated is tetrachloroethane and trichloroethylene is produced.

5. The process of claim 4 wherein the alkaline earth metal hydroxide is calcium hydroxide and the temperature of the reaction mixture in the first chamber is maintained at between 60 to 72 degrees centigrade.

6. The process of claim 5 wherein the rate of transfer of reaction mixture from the first chamber to the second chamber permits a retention time in the first chamber of between about 20 to 40 minutes.

7. A continuous process for dehydrochlorinating tetrachloroethane to produce trichloroethylene which comprises: continuously introducing liquid tetrachloroethane and an excess of aqueous calcium hydroxide slurry into a closed chamber substantially completely filled with an agitated body of liquid reaction mixture; maintaining said mixture at a temperature of about 70 degrees centigrade; continually transferring a portion of the reaction mixture in the liquid phase, at a rate substantially equal to the combined rate at which the reactants are introduced into the first chamber and which permits a reaction time in the first chamber of about 20 to 40 minutes, into a second chamber containing aqueous inorganic constituents of the reaction mixture maintained at a temperature between about 94 and 103 degrees centigrade; and condensing the trichloroethylene and any unreacted tetrachloroethane so flash-distilled.

8. A continuous process for dehydrochlorinating pentachloroethane to produce perchloroethylene which comprises: continuously introducing liquid pentachloroethane and an excess of aqueous calcium hydroxide slurry into a closed chamber substantially completely filled with an agitated body of liquid reaction mixture; maintaining said mixture at a temperature of about 88 degrees centigrade; continually transferring a portion of the reaction mixture in the liquid phase, at a rate substantially equal to the combined rate at which the reactants are introduced into the first chamber and which permits a reaction time in the first chamber of about one hour, into a second chamber containing aqueous inorganic constituents of the reaction mixture maintained at a temperature between about 98 and 103 degrees centigrade; and condensing the perchloroethylene and any unreacted pentachloroethane so flash-distilled.

AYLMER HENRY MAUDE.
DAVID SOLOMON ROSENBERG.

REFERENCES CITED

The following references are of record in the file of this patent:

UNITED STATES PATENTS

| Number | Name | Date |
|---|---|---|
| 414,936 | Burcey | Nov. 12, 1889 |
| 2,369,485 | Nichols | Feb. 13, 1945 |

FOREIGN PATENTS

| Number | Country | Date |
|---|---|---|
| 171,900 | Germany | June 18, 1906 |